(12) United States Patent
Allison et al.

(10) Patent No.: US 7,962,734 B2
(45) Date of Patent: Jun. 14, 2011

(54) METHOD OF RESTARTING A COMPUTER PLATFORM

(75) Inventors: Michael S. Allison, Fort Collins, CO (US); Stephen Patrick Hack, Livermore, CO (US); John A. Morrison, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 981 days.

(21) Appl. No.: 11/686,528

(22) Filed: Mar. 15, 2007

(65) Prior Publication Data

US 2008/0072028 A1   Mar. 20, 2008

Related U.S. Application Data

(63) Continuation-in-part of application No. 11/523,870, filed on Sep. 20, 2006, now Pat. No. 7,600,111.

(51) Int. Cl.
*G06F 1/24* (2006.01)
(52) U.S. Cl. .................................... 713/1; 713/2
(58) Field of Classification Search .................. 713/1, 2
See application file for complete search history.

(56) References Cited

U.S. PATENT DOCUMENTS

| | | | | |
|---|---|---|---|---|
| 5,701,492 A * | 12/1997 | Wadsworth et al. | ......... | 717/173 |
| 5,708,388 A * | 1/1998 | Carlile | ......... | 327/544 |
| 5,903,765 A | 5/1999 | White et al. | | |
| 6,336,185 B1 * | 1/2002 | Sargenti et al. | ......... | 713/2 |
| 6,763,454 B2 * | 7/2004 | Wilson et al. | ......... | 713/1 |
| 6,832,311 B2 * | 12/2004 | Morisawa | ......... | 713/1 |
| 6,990,576 B2 * | 1/2006 | Qureshi et al. | ......... | 713/2 |
| 7,073,051 B2 * | 7/2006 | Touchet | ......... | 713/1 |
| RE40,092 E * | 2/2008 | Kang | ......... | 713/2 |
| 7,356,684 B2 * | 4/2008 | Han et al. | ......... | 713/2 |
| 7,461,244 B2 * | 12/2008 | Chen et al. | ......... | 713/1 |
| 7,480,791 B2 * | 1/2009 | Rothman et al. | ......... | 713/1 |
| 7,529,921 B2 * | 5/2009 | Stein et al. | ......... | 713/1 |
| 7,536,537 B2 * | 5/2009 | Linn | ......... | 713/1 |
| 7,568,090 B2 * | 7/2009 | Morrison et al. | ......... | 713/2 |
| 7,590,839 B2 * | 9/2009 | van der Veen et al. | ......... | 713/2 |
| 7,716,464 B2 * | 5/2010 | Rothman et al. | ......... | 713/2 |
| 2004/0006690 A1 * | 1/2004 | Du et al. | ......... | 713/2 |
| 2004/0143696 A1 | 7/2004 | Hsieh | | |
| 2005/0015581 A1 | 1/2005 | Chen | | |
| 2005/0038981 A1 * | 2/2005 | Connor et al. | ......... | 713/1 |
| 2005/0268081 A1 * | 12/2005 | Han et al. | ......... | 713/1 |
| 2006/0015866 A1 * | 1/2006 | Ang et al. | ......... | 717/174 |
| 2006/0026429 A1 | 2/2006 | Kudo et al. | | |
| 2006/0053268 A1 * | 3/2006 | Fontijn et al. | ......... | 712/1 |
| 2006/0184781 A1 * | 8/2006 | Inada et al. | ......... | 713/1 |
| 2006/0242398 A1 * | 10/2006 | Fontijn et al. | ......... | 713/2 |
| 2006/0282654 A1 * | 12/2006 | Veen et al. | ......... | 713/1 |
| 2007/0016763 A1 * | 1/2007 | Koyama et al. | ......... | 713/1 |

(Continued)

*Primary Examiner* — Thomas Lee
*Assistant Examiner* — Zahid Choudhury (57) ABSTRACT

Provided is a method for restarting a computing platform to a state in which applications run in less time than an initial start, including powering on a computing platform having a plurality of devices; identifying one or more of the devices which are not critical to running applications; storing information about the non-critical devices; restarting the computing platform; retrieving the information about the non-critical devices; disabling the non-critical devices; performing at least one of testing and initialization of at least one device of the plurality of devices that are critical to running the applications before the restart is completed; offloading at least one of testing and initialization of at least one of the non-critical devices; enabling devices which are not non-critical; and enabling the non-critical devices after the restart is completed.

36 Claims, 4 Drawing Sheets

U.S. PATENT DOCUMENTS

| | | | |
|---|---|---|---|
| 2007/0124570 A1* | 5/2007 | Chen et al. | 713/1 |
| 2007/0135866 A1* | 6/2007 | Baker et al. | 607/60 |
| 2007/0162736 A1* | 7/2007 | Wu et al. | 713/2 |
| 2008/0072026 A1* | 3/2008 | Allison et al. | 713/1 |
| 2008/0209198 A1* | 8/2008 | Majni et al. | 713/2 |
| 2010/0017591 A1* | 1/2010 | Smith et al. | 713/2 |

* cited by examiner

METHOD OF RESTARTING A COMPUTER PLATFORM

CROSS-REFERENCE TO RELATED APPLICATIONS

This application is a continuation-in-part of prior U.S. patent application Ser. No. 11/523,870, filed Sep. 20, 2006 now U.S. Pat. No. 7,600,111, which is hereby incorporated herein by reference in its entirety.

BACKGROUND

Advanced Configuration and Power Interface (ACPI) is a specification that makes hardware status information available to an operating system (OS) in a computer, such as a laptop, desktop, server, etc. More information about ACPI may be found in the 600-plus page "Advanced Configuration and Power Interface Specification," Revision 3.0a, Dec. 30, 2005, cooperatively defined by Hewlett-Packard Corporation, Intel Corporation, Microsoft Corporation, Phoenix Technologies Ltd., and Toshiba Corporation, available at http://www.acpi.info/DOWNLOADS/ACPIspec30a.pdf. The ACPI specification was developed to establish industry common interfaces enabling robust OS-directed motherboard device configuration and power management of both devices and entire systems. ACPI is the key element in operating system-directed configuration and power management (OSPM).

ACPI is used in computing platforms running a variety of operating systems, and allows the operating system to manipulate hardware resources. For example, ACPI assists in power management by allowing a computer system's peripherals to be powered on and off for improved power management. ACPI also allows the computer system to be turned on and off by external devices. For example, the touch of a mouse or the press of a key may wake up a computer system in a sleep or stand-by mode using ACPI.

ACPI has its own source and machine languages, referred to as ACPI Source Language (ASL) and ACPI Machine Language (AML), respectively. ASL is used to write new ACPI control methods, whereby ACPI is used by an OS to control new devices, or to control devices in new ways. ACPI comprises both static and interpretable tables containing device information. When the computing platform is powered on or restarted, the system firmware (such as the BIOS, or Basic Input/Output System) constructs the static tables, which are used by the OS. The interpretable tables are composed of AML, which is merged into the system firmware. The operating system reads the AML from the interpretable tables and executes the architected interfaces, using an ACPI interpreter. In this fashion, the operating system manipulates hardware resources. Because the interpretable tables are merged into the system firmware, this conventional approach can lack flexibility in controlling various configurations of a computing platform.

An ACPI namespace is a hierarchical tree structure in OS-controlled memory that contains named objects. These objects may be data objects, control method objects, bus/device package objects, and so on. The OS dynamically changes the contents of the namespace by loading and/or unloading definition blocks from the ACPI tables. Information in the ACPI namespace comes from a differentiated system description table (DSDT), which contains the differentiated definition block, and one or more other definition blocks. An original equipment manufacturer (OEM) typically supplies a DSDT to an ACPI-compatible OS, which supplies the implementation and configuration information about the base system. The OS inserts the DSDT information into the ACPI namespace at system boot time and doesn't remove it.

Another ACPI construct is the secondary system description table (SSDT). Multiple SSDTs can be used as part of a platform description. After the DSDT is loaded into the ACPI namespace, each secondary description table with a unique OEM Table ID is loaded. This allows the OEM to provide the base support in one table, while adding smaller system options in other tables. Additional tables can only add data; they cannot overwrite or remove data from previous tables.

Another construct in the ACPI architecture is defined by the system abstract layer (SAL); and is called a firmware interface table (FIT). The FIT contains starting addresses and sizes for the firmware components that are outside the protected boot block. A good overview of the FIT entry specification may be found in the "Intel® Itanium® Processor Family System Abstraction Layer Specification", Document No. 245359-007, (Intel December 2003), available at http://www.intel.com/design/itanium/downloads/24535907.pdf.

SUMMARY

Presented is a method of restarting a computer platform after an initial boot, to reboot more quickly than initially to a state in which an application can be run. An Advanced Configuration and Power Interface (ACPI) control method is introduced for marking devices that are not critical for booting the OS to execute applications. Such devices can comprise, for example, processors, memory, and/or input/output (I/O) devices. The operating system (OS) invokes the ACPI control method to mark such devices. The computing platform retains this information in a data store for the next time the computer platform is powered on or restarted. On the next start, the non-critical device information is retrieved. ACPI tables then built by the computing platform identify all of the devices for the OS, but those devices that were marked as not critical for boot are disabled, and the OS boots without them, thereby saving OS booting time. In addition, testing and/or initialization of the non-critical devices may be "offloaded" (i.e., delayed until after the OS boots, or performed in parallel with the booting of the OS), thus potentially reducing the OS booting time further. Once the OS is booted, the platform can run applications. The computing platform notifies the OS to perform ACPI on-line add operations to add the devices marked non-critical to the booted OS, after which the OS can use those devices. Devices can also be marked by the OS as non-critical after the occurrence of events other than startup, such as when configuration changes occur, or when device errors are detected. This enables the OS to continually identify criticality of devices. The non-critical resources stored by the platform preferably can also be reset by a user to a default configuration, such as to the factory default settings, for example, in case the resources are incorrectly set.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, example of which is illustrated in the accompanying drawings.

Provided is a mechanism that uses a new ACPI control method in conjunction with ACPI on-line add features whereby an OS of a restarted computing platform boots faster than an initial boot, to the point of being able to run an application. The new ACPI control method is invoked by the OS to identify devices that do not need to be booted to run the application. The computing platform retains non-critical device information for use the next time the computing platform is started. The next time the computing platform is started, the platform retrieves the non-critical device information, and ACPI tables built by the platform identify all of the devices, but those devices that were specified as not critical are disabled in the ACPI tables. The OS uses the ACPI tables to boot. After the OS boots, it cannot use the disabled devices, but it is able to run applications, and it has achieved a state in which it can run applications more quickly than if it had booted with all devices enabled. The platform then performs ACPI on-line add operations to add the non-critical devices to the booted OS. Once all of the devices have been added, the OS is fully operational. In this way, the OS boots faster to the point where it can start processing applications.

The OS also invokes the new ACPI control method after the occurrence of events other than startup that affect the operation of devices, such as configuration changes, device errors, and the like. Thereby, the OS continually identifies the criticality of devices.

Figure 1:
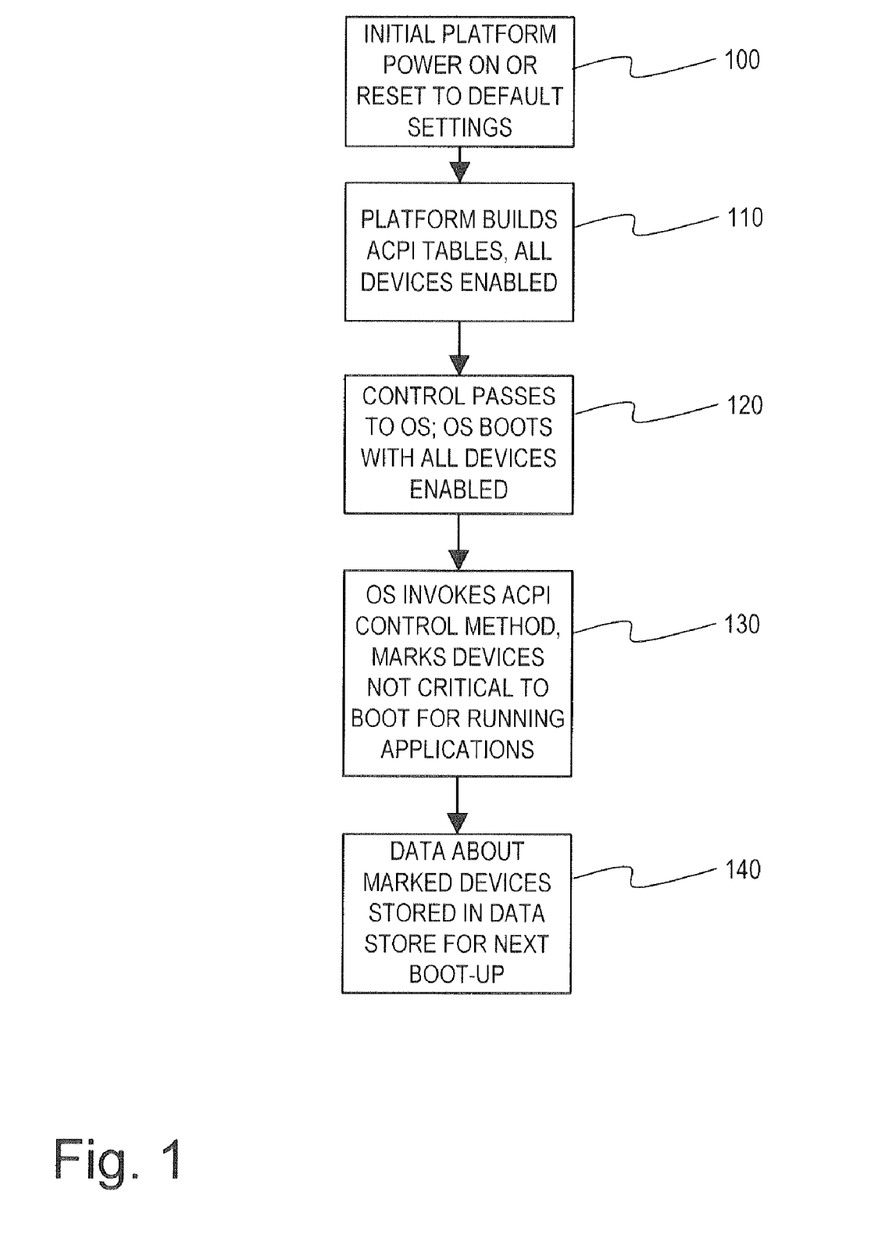
FIG. 1 shows a method for a computing platform to mark non-critical devices using an ACPI control method, in accordance with an exemplary embodiment of the invention.

FIG. 1 shows a method for a computing platform to mark non-critical devices. The platform is initially powered on, such as by pressing an "on" button, or is reset to a default configuration such as original factory settings (step 100). The platform then builds ACPI tables in the conventional way, enabling all devices (step 110). After the ACPI tables are built, control passes to the OS, which uses the tables to boot with all devices enabled (step 120). The OS invokes an ACPI method for marking devices that are not critical for running applications as non-critical devices (step 130). The method can consist of AML code that can directly store the non-critical device information or can make a call into the system firmware (such as a BIOS, or basic input/output system) to perform the operation. Information of the marked devices is stored in a data store, such as a non-volatile memory, for use the next boot-up, such as the next time the computer platform power is cycled off and on, or if the computer platform power is lost unexpectedly, such as when a power system failure occurs. Other storage devices can be used, but using non-volatile memory for storing the information advantageously allows the user to choose the stored information when restarting the computing platform, or to reset the information to a default configuration if required or desired.

Figure 2:
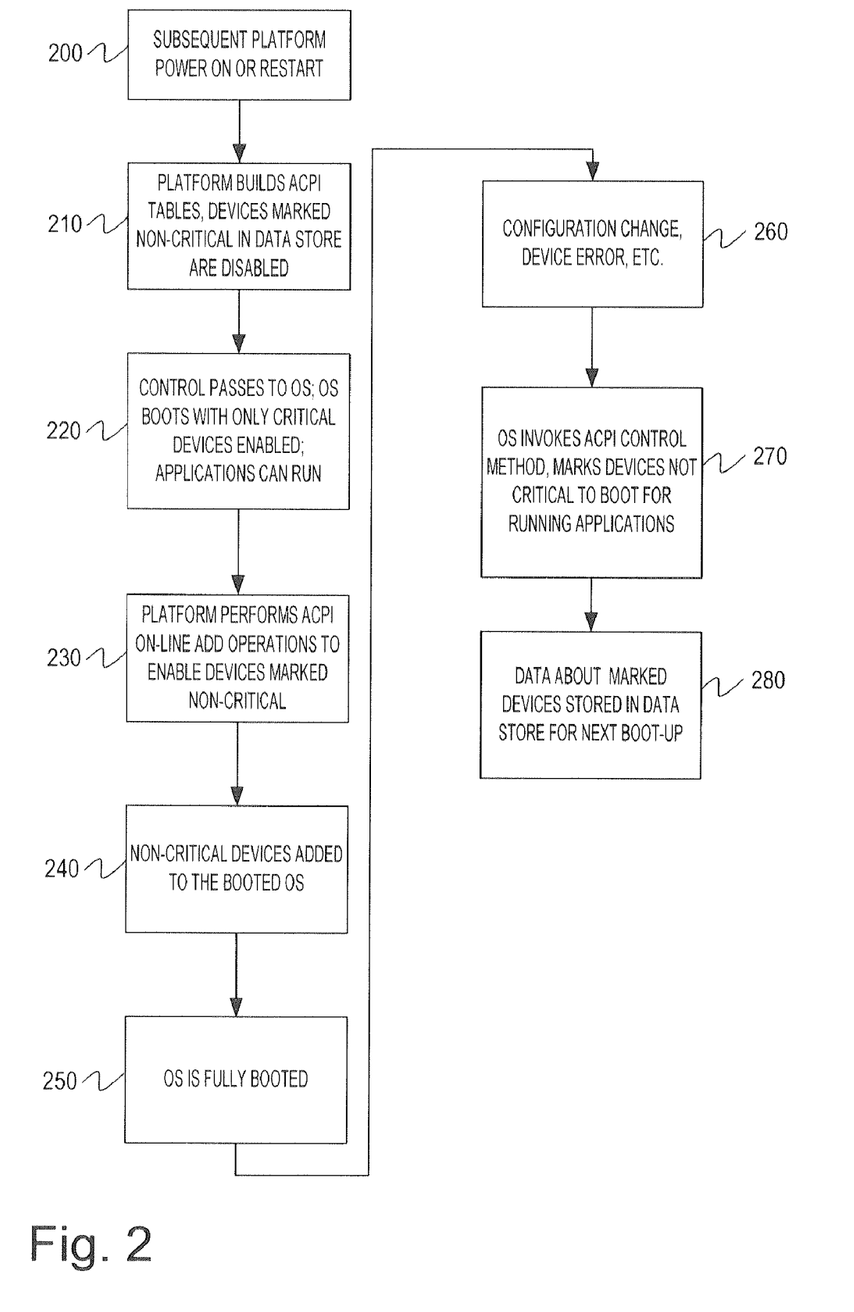
FIG. 2 shows a method for a computing platform to boot with non-critical devices disabled in ACPI tables until the OS is booted, in accordance with an exemplary embodiment of the invention.

FIG. 2 shows a method for a computing platform to start with non-critical devices disabled in ACPI tables until the OS is booted. The computing platform is started subsequent to an initial power on or reset to default settings as in FIG. 1, such as by powering on after shutdown, or pressing a "restart" button (step 200). The platform retrieves from the data store the information of the devices marked non-critical, and builds ACPI tables with all devices identified, but with the non-critical devices disabled (step 210). In conjunction with or prior to building the ACPI tables, the platform may perform or initiate testing and/or initialization of the devices listed in the tables. In one embodiment, the platform consults the information from the data store to offload at least some of the testing and/or initialization of one or more of the non-critical devices. This offloading may allow the platform to utilize its processing bandwidth for testing/initializing each of the remaining devices deemed necessary or critical for booting the OS. In one example of offloading, the testing/initialization of the non-critical devices may be postponed or delayed until the booting of the OS is complete. This postponement may thus result in even greater reduction in the amount of time required to boot the OS. In another implementation, a processor or other device not required for booting the OS may be employed to perform the testing/initialization of the non-critical devices in parallel with (e.g., concurrently or simultaneously with) the booting of the OS. For example, a processor performing the testing/initialization of a non-critical device may be another one of the non-critical devices. As a result, the testing/initialization of the non-critical devices is offloaded to either a later time, or to another processor or similar device not tasked with booting the OS.

After the ACPI tables are built, control passes to the OS. The OS boots with the non-critical devices disabled, in other words, with only critical devices enabled. Applications can then run (step 220). The computing platform then performs ACPI on-line add operations to enable the devices marked non-critical in the ACPI tables as initially reported to the OS (step 230), thereby avoiding race conditions in which the OS tries to modify the list of non-critical devices before the computing platform completes the on-line additions. In conjunction with the ACPI on-line add operations, the platform may perform or initiate testing/initialization of one or more of the non-critical devices that was previously delayed or postponed, as described above, as part of the on-line add operation for that particular non-critical device. In another embodiment, the ACPI on-line add operations may occur without completion of the testing/initialization of one or more of the non-critical devices. In that case, the OS may assume responsibility for performing at least some of the test/initialization of those non-critical devices.

The non-critical devices are then added to the booted OS (step 240), whereupon the OS is fully booted (step 250). The OS monitors the computer platform for an event that alters the availability or criticality of devices, such as a configuration change or a device error, for example (Step 260). If such an alteration is detected, the OS invokes the new ACPI control method and again marks devices not critical to boot for running applications (step 270). The OS flushes the prior non-critical device information in the data store, and stores information of the newly marked non-critical devices in the data store for use in the next boot-up (step 280).

Figure 3:
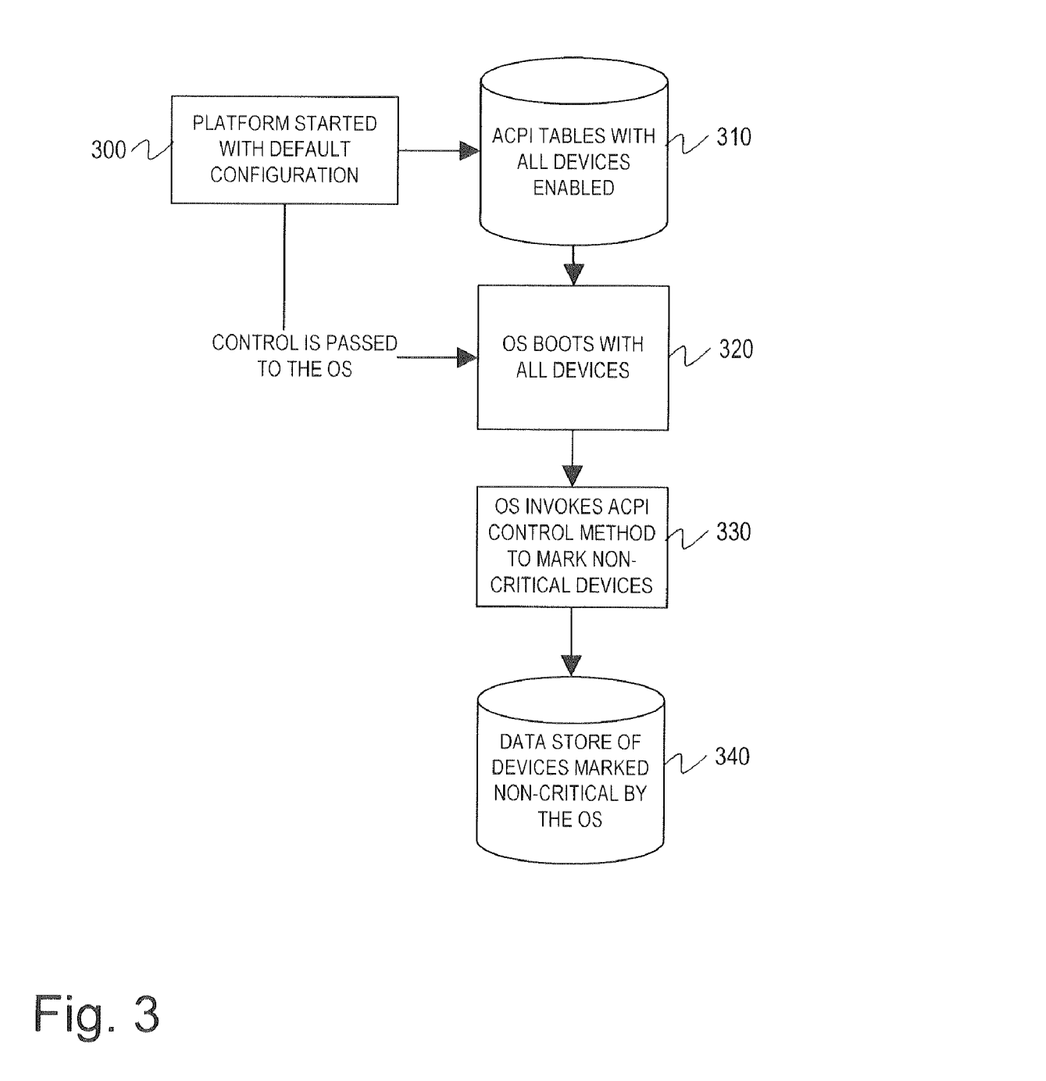
FIG. 3 shows a method for the OS to mark non-critical devices, in accordance with an exemplary embodiment of the invention.

FIG. 3 shows a method for the OS to mark non-critical devices upon startup with default settings. The computing platform is started with a default configuration, such as by turning it on for the first time or resetting to its default settings (300). The platform builds ACPI tables (310) with all devices enabled. Control is passed to the OS, which boots with all devices (320). The booted OS invokes an ACPI control method to mark devices which are non-critical to running an application (330). Information of the non-critical devices is stored in data store (340).

Figure 4:
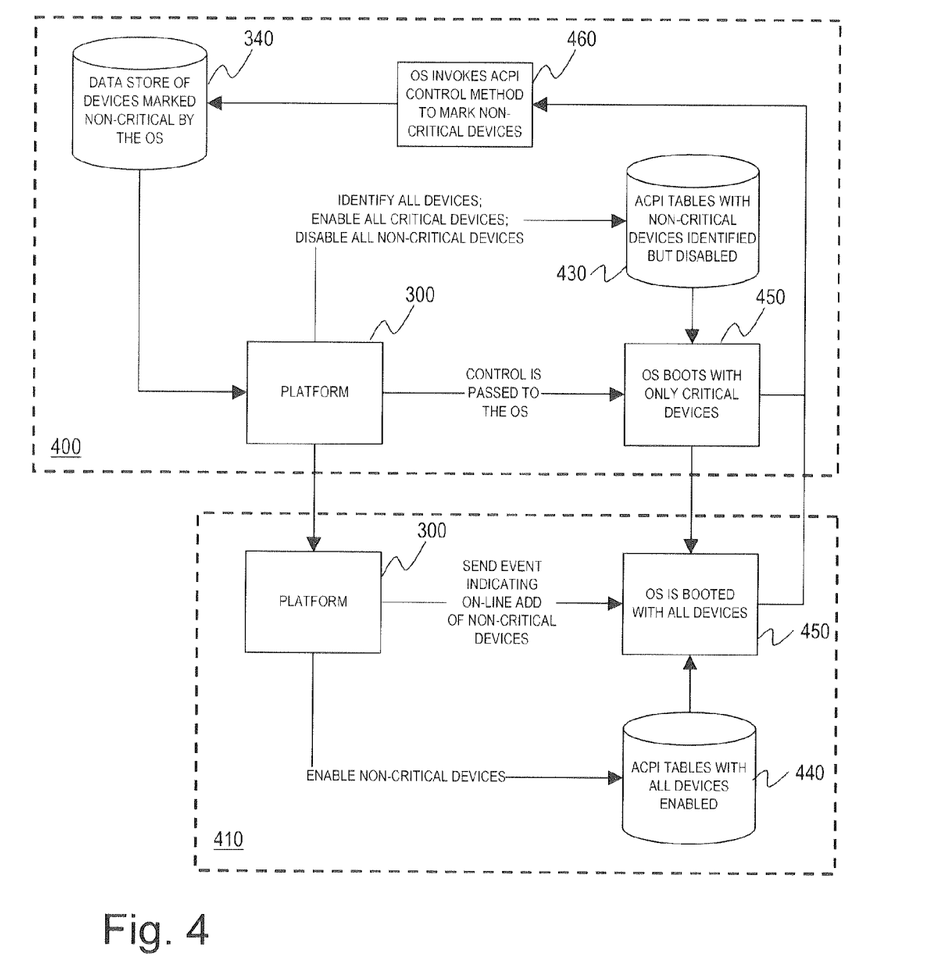
FIG. 4 shows a method for booting an OS with non-critical devices disabled in ACPI tables, thereafter enabling and adding the non-critical devices, in accordance with an exemplary embodiment of the invention.

FIG. 4 shows a method for booting an OS with non-critical devices disabled in ACPI tables (400), thereafter enabling the non-critical devices (410). After an initial startup as in FIG. 3, upon restarting, computing platform 300 retrieves the information of the non-critical devices stored in data store 340. Platform 300 uses the information to build ACPI tables with all devices identified, but with the non-critical devices disabled and only the remaining, critical, devices enabled. The platform 300 may also perform or initiate any testing and/or initialization of the critical devices prior to or in conjunction with building the ACPI tables. Testing/initialization of the non-critical devices may be offloaded (i.e., delayed, or performed in parallel with the testing/initialization of the critical devices) as described above to allow the platform 300 to more quickly complete the building of the tables. Control is passed to the OS, which boots with only the critical devices (430). After booting with the critical devices (400), the computing platform is able to run an application, such as a user program, but cannot use the non-critical devices. The OS then gains control of the non-critical devices (410). To do this, the platform enables the non-critical devices in the ACPI tables, so that the ACPI tables have all devices enabled (440). The platform sends an event to the OS directing it to use an ACPI on-line add function to add non-critical devices. The OS then adds the non-critical devices, and is booted with all devices (450). In one implementation, the platform, in response to the OS adding one or more of the non-critical devices, may perform or initiate any testing/initialization of the particular non-critical device being added. In another embodiment, the OS may instead perform or initiate such testing/initialization in whole or in part after the non-critical device has been added. After the OS boots, either with only critical devices or with all devices, the OS monitors the computer platform for an event that alters the availability or criticality of devices for the next boot. If such an alteration is detected, the OS invokes the new ACPI method and again marks devices not critical to boot for running applications (460). The OS flushes the prior non-critical device information, and stores information of the newly marked non-critical devices in the data store (340) for use in the next boot-up.

In accordance with the invention, after an initial boot the computing platform can be restarted with a minimum set of devices, so that the OS boots as quickly as possible. In addition, the OS monitors for resources to be enabled or disabled at the next boot. This makes the invention usable in any OS that uses ACPI.

All patents, patent applications, publications, and other references cited or described in this document are hereby incorporated herein by reference, in their entirety.

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for restarting a computing platform comprising a plurality of devices to a state in which applications run in less time than an initial start, comprising:
   powering on the computing platform;
   identifying one or more devices of the plurality of devices which are not critical to running applications;
   storing information about the non-critical devices;
   restarting the computing platform;
   retrieving the information about the non-critical devices;
   disabling the non-critical devices;
   performing at least one of testing and initialization of at least one device of the plurality of devices that are critical to running the applications before the critical devices are enabled;
   offloading at least one of testing and initialization of at least one of the non-critical devices;
   enabling the critical devices; and
   said platform enabling or directing said operating system to enable the non-critical devices after the restart is completed.

2. The method of claim 1, wherein the identifying step occurs after at least one of initial boot-up, a configuration change, and detection of a device error.

3. The method of claim 1, wherein the offloading step comprises performing at least one of testing and initialization of the at least one of the non-critical devices in parallel with performing at least one of testing and initialization of the at least one of the critical devices.

4. The method of claim 3, wherein performing at least one of testing and initialization of the at least one of the non-critical devices is performed by another one of the non-critical devices.

5. The method of claim 1, wherein the offloading step comprises performing at least one of testing and initialization of the at least one of the non-critical devices in response to enabling the at least one of the non-critical devices.

6. The method of claim 5, wherein performing at least one of testing and initialization of the at least one of the non-critical devices is performed by the computing platform.

7. The method of claim 1, wherein the offloading step comprises performing at least one of testing and initialization of the at least one of the non-critical devices after enabling the at least one of the non-critical devices.

8. The method of claim 7, wherein performing at least one of testing and initialization of the at least one of the non-critical devices is performed by an operating system executing on the computing platform.

9. A method for a computing platform to mark devices not critical to running an application, wherein the computing platform has an operating system (OS) that uses the Advanced Configuration and Power Interface (ACPI); comprising:
   providing an ACPI control method for identifying non-critical devices;
   powering on the computing platform comprising a plurality of devices;
   providing ACPI tables with all devices enabled;
   passing control to the OS;
   booting the OS with all devices;
   invoking the ACPI control method to identify devices which are not critical for running an application as non-critical devices;
   storing information about the non-critical devices;
   restarting the computing platform;
   retrieving the information about the non-critical devices;

providing ACPI tables wherein:
  all devices are identified;
  non-critical devices are disabled; and
  devices which are not non-critical are enabled;
performing at least one of testing and initialization of at least one of the critical devices;
offloading at least one of testing and initialization of at least one of the non-critical devices;
passing control to the OS;
booting the OS with the critical devices;
enabling the non-critical devices in the ACPI tables;
sending an event to the OS to use an on-line add operation to add each non-critical device; and
using said platform performing or directing said operating system to perform an on-line add operation to add each non-critical device after booting the OS with the critical devices has been completed.

10. The method of claim 9, wherein the invoking step occurs after at least one of initial boot-up, a configuration change, a reset to default settings, and detection of a device error.

11. The method of claim 9, wherein the offloading step comprises performing at least one of testing and initialization of the at least one of the non-critical devices in parallel with performing at least one of testing and initialization of the at least one of the critical devices.

12. The method of claim 11, wherein performing at least one of testing and initialization of the at least one of the non-critical devices is performed by another one of the non-critical devices.

13. The method of claim 9, wherein the offloading step comprises performing at least one of testing and initialization of the at least one of the non-critical devices in response to using the on-line add operation to add the at least one of the non-critical devices.

14. The method of claim 13, wherein performing at least one of testing and initialization of the at least one of the non-critical devices is performed by the computing platform.

15. The method of claim 9, wherein the offloading step comprises performing at least one of testing and initialization of the at least one of the non-critical devices after using the on-line add operation to add the at least one of the non-critical devices.

16. The method of claim 15, wherein performing at least one of testing and initialization of the at least one of the non-critical devices is performed by the operating system.

17. A computing platform, comprising:
  a plurality of devices, wherein at least one of the devices is critical to running applications on the computing platform, and wherein at least another one of the devices is not critical to running the applications;
  wherein the computer platform is configured to identify the at least one non-critical device after being powered on and store information about the at least one non-critical device; and
  wherein the computer platform is further configured to retrieve the information about the at least one non-critical device after being restarted, disable the at least one non-critical device, perform at least one of testing and initialization of the at least one critical device before the at least one critical device is enabled, offload at least one of testing and initialization of the at least one non-critical device, enable the at least one critical device, and then enable the at least one non-critical device after the restart is complete.

18. The computing platform of claim 17, wherein the computing platform is configured to identify the at least one non-critical device after at least one of initial boot-up, a configuration change, and detection of a device error.

19. The computing platform of claim 17, wherein the computing platform is further configured to perform at least one of testing and initialization of the at least one non-critical device in parallel with performing at least one of testing and initialization of the at least one critical device.

20. The computing platform of claim 19, wherein another non-critical device of the plurality of devices is configured to perform at least one of testing and initialization of the at least one non-critical device.

21. The computing platform of claim 17, wherein the computing platform is further configured to offload at least one of testing and initialization of the at least one non-critical device by performing at least one of testing and initialization of the at least one non-critical device in response to enabling the at least one non-critical device.

22. The computing platform of claim 17, wherein the computing platform is further configured to offload at least one of testing and initialization of the at least one non-critical device by performing at least one of testing and initialization of the at least one non-critical device after enabling the at least one non-critical device.

23. The computing platform of claim 22, wherein the computing platform further comprises an operating system configured to perform at least one of testing and initialization of the at least one non-critical device.

24. A non-transitory computer-readable medium comprising instructions executable by a computing platform comprising a plurality of devices to perform a method of restarting the computing platform, the method comprising:
  after the computing platform is powered on, identifying one or more devices of the plurality of devices which are not critical to running applications on the computing platform;
  storing information about the non-critical devices;
  after the computing platform is restarted, retrieving the information about the non-critical devices;
  disabling the non-critical devices;
  performing at least one of testing and initialization of at least one device of the plurality of devices that are critical to running the applications before the critical devices are enabled; and
  offloading at least one of testing and initialization of at least one of the non-critical devices;
  enabling the critical devices; and
  said platform performing ACPI on-line add operations or directing an operating system to perform ACPI on-line add operations so as to enable the non-critical devices after the restart is completed.

25. The computer-readable medium of claim 24, wherein identifying the non-critical devices occurs after at least one of initial boot-up, a configuration change, and detection of a device error.

26. The computer-readable medium of claim 24, wherein offloading at least one of testing and initialization of at least one of the non-critical devices comprises performing at least one of testing and initialization of the at least one of the non-critical devices in parallel with performing at least one of testing and initialization of the at least one of the critical devices.

27. The computer-readable medium of claim 26, wherein performing at least one of testing and initialization of the at least one of the non-critical devices is performed by another one of the non-critical devices.

28. The computer-readable medium of claim 24, wherein offloading at least one of testing and initialization of at least one of the non-critical devices comprises performing at least one of testing and initialization of the at least one of the non-critical devices in response to enabling the at least one of the non-critical devices.

29. The computer-readable medium of claim 24, wherein offloading at least one of testing and initialization of at least one of the non-critical devices comprises performing at least one of testing and initialization of the at least one of the non-critical devices after enabling the at least one of the non-critical devices.

30. The computer-readable medium of claim 29, wherein performing at least one of testing and initialization of the at least one of the non-critical devices is performed by an operating system executing on the computing platform.

31. A method comprising:
a platform building ACPI tables in which at least one critical device is marked "enabled" and at least one non-critical device is marked "disabled";
booting an operating system with said critical device enabled and said non-critical device disabled; and
said platform performing one or more ACPI on-line add operations to enable or directing said operating system to perform one or more ACPI on-line add operations to enable said non-critical device.

32. A method as recited in claim 31 wherein said platform performs said one or more on-online operations.

33. A method as recited in claim 31 wherein, after said operating system is booted, said platform:
marks said non-critical device "enabled" in said ACPI table, and
directs said operating system to perform said one or more on-online operations.

34. A method as recited in claim 31 wherein initialization of said critical device is performed before said operating system begins booting and initialization of said non-critical device is performed while said operating system is booting.

35. A method as recited in claim 31 wherein initialization of said critical device is performed before said operating system begins booting and initialization of said non-critical device is performed after said operating system is booted.

36. A method as recited in claim 31 further comprising running an application on said operating system before said one or more ACPI on-line add operations are performed.

* * * * *

UNITED STATES PATENT AND TRADEMARK OFFICE
CERTIFICATE OF CORRECTION

PATENT NO. : 7,962,734 B2
APPLICATION NO. : 11/686528
DATED : June 14, 2011
INVENTOR(S) : Michael S. Allison et al.

It is certified that error appears in the above-identified patent and that said Letters Patent is hereby corrected as shown below:

In column 7, line 14, in Claim 9, before "said" delete "using".

Signed and Sealed this
Sixth Day of December, 2011

David J. Kappos
*Director of the United States Patent and Trademark Office*